United States Patent
Kim et al.

(10) Patent No.: US 11,656,144 B2
(45) Date of Patent: May 23, 2023

(54) TIRE MONITORING SYSTEM INCLUDING CONTROLLER CONFIGURED TO CONTROL OUTPUT UNIT TO OUTPUT A WARNING SIGNAL AND TIRE MONITORING METHOD USING THE SAME

(71) Applicant: KUMHO TIRE CO., INC, Gwangju (KR)

(72) Inventors: Hyoungseok Kim, Yongin-si (KR); Hyounjung Kim, Yongin-si (KR)

(73) Assignee: KUMHO TIRE CO., INC., Gwangju (KR)

( * ) Notice: Subject to any disclaimer, the term of this patent is extended or adjusted under 35 U.S.C. 154(b) by 32 days.

(21) Appl. No.: 17/382,775

(22) Filed: Jul. 22, 2021

(65) Prior Publication Data

US 2022/0146362 A1 May 12, 2022

(30) Foreign Application Priority Data

Nov. 10, 2020 (KR) .......................... 10-2020-0149296

(51) Int. Cl.
*G01M 3/26* (2006.01)
*B60C 11/24* (2006.01)
*B60C 19/00* (2006.01)
*B60C 23/04* (2006.01)
(Continued)

(52) U.S. Cl.
CPC ............. *G01M 3/26* (2013.01); *B60C 11/246* (2013.01); *B60C 19/00* (2013.01);
(Continued)

(58) Field of Classification Search
None
See application file for complete search history.

(56) References Cited

U.S. PATENT DOCUMENTS 7,557,693 B2 * 7/2009 Zhu .......................... B60Q 1/52
340/441
9,296,263 B2 * 3/2016 Muthukumar ............ B60T 1/10
(Continued)

FOREIGN PATENT DOCUMENTS

DE 10 2005 052476 A1 5/2007
DE 10 2008 002722 A1 12/2009
(Continued)

OTHER PUBLICATIONS

Office Action in Korean Application No. 10-2020-0149296 dated Feb. 25, 2022 in 6 pages.
(Continued)

*Primary Examiner* — Octavia Davis Hollington
*Assistant Examiner* — Jermaine L Jenkins
(74) *Attorney, Agent, or Firm* — Knobbe, Martens, Olson & Bear, LLP

(57) ABSTRACT

This application relates to a tire monitoring system. In one aspect, the system includes a sensor module installed in a tire provided in a vehicle to obtain tire data and a communication module. The communication module may include a transceiver configured to transmit and receive the tire data, and an output unit configured to output one of a caution signal and a warning signal. The communication module may also include a controller configured to determine whether a state of the tire is abnormal based on the tire data and control the output unit to output one of the caution signal and the warning signal based on the determination result.

5 Claims, 7 Drawing Sheets

(51) Int. Cl.
  *G01L 17/00* (2006.01)
  *G01M 17/02* (2006.01)
  *G07C 5/08* (2006.01)
  *H04Q 9/00* (2006.01)

(52) U.S. Cl.
  CPC .......... *B60C 23/0488* (2013.01); *G01L 17/00* (2013.01); *G01M 17/02* (2013.01); *G07C 5/0816* (2013.01); *H04Q 9/00* (2013.01); *B60C 2019/004* (2013.01); *H04Q 2209/40* (2013.01)

(56) References Cited

U.S. PATENT DOCUMENTS

| | | | |
|---|---|---|---|
| 10,112,444 B2 * | 10/2018 | Takahashi | B60C 19/00 |
| 10,619,992 B2 * | 4/2020 | Darrer | G01M 17/02 |
| 11,383,563 B2 * | 7/2022 | Malard | B60C 23/0442 |
| 2014/0366618 A1 | 12/2014 | Singh et al. | |

FOREIGN PATENT DOCUMENTS

| | | | | |
|---|---|---|---|---|
| EP | 1 106 397 A2 | 6/2001 | | |
| EP | 2 777 957 A2 | 9/2014 | | |
| EP | 3 733 430 A1 | 11/2020 | | |
| JP | 2008-143459 A | 6/2008 | | |
| KR | 10-2012-0027096 A | 3/2012 | | |
| KR | 10-1240440 A | 3/2013 | | |
| KR | 10-1324718 A | 11/2013 | | |
| KR | 10-2014-0080970 A | 7/2014 | | |
| KR | 10-2019-0048319 A | 5/2019 | | |
| WO | WO-2013074901 A2 * | 5/2013 | ............. | B60K 35/00 |

OTHER PUBLICATIONS

Extended European Search Report in EP Application No. 21206605.4 dated Apr. 4, 2022 in 12 pages.
Office Action in Korean Application No. 10-2020-0149296 dated Aug. 18, 2022 and English machine translation.

* cited by examiner

FIG.4

| COMMUNICATION MODULE IDENTIFICATION CODE | TIRE IDENTIFICATION CODE | SENSOR IDENTIFICATION CODE | AIR PRESSURE | ACCELERATION | VOLTAGE | TEMPERATURE | WEAR RATE | GPS | STATE ABNORMALITY INFORMATION |
|---|---|---|---|---|---|---|---|---|---|

P2

TIRE MONITORING SYSTEM INCLUDING CONTROLLER CONFIGURED TO CONTROL OUTPUT UNIT TO OUTPUT A WARNING SIGNAL AND TIRE MONITORING METHOD USING THE SAME

CROSS-REFERENCE TO RELATED APPLICATION

This application is based on and claims priority from Korean Patent Application No. 10-2020-0149296 filed on Nov. 10, 2020, the disclosures of which are incorporated herein in its entirety by reference for all purposes.

TECHNICAL FIELD

The present disclosure relates to a tire monitoring system and a tire monitoring method using the same.

BACKGROUND

Getting to one's destination safely is of great importance to a group of consumers who own a car. Various types of automobiles or vehicles have become an essential means of transportation or transport equipment in modern society. As a result, people are paying more and more attention to safety when driving vehicles.

SUMMARY

One aspect is a tire monitoring system and a tire monitoring method using the same capable of determining whether a state of a tire is abnormal by forming tire data.

Another aspect is a tire monitoring system including: a sensor module installed in a tire provided in a vehicle to obtain tire data; and a communication module including: a transceiver configured to transmit and receive the tire data; an output unit configured to output one of a caution signal and a warning signal; and a controller configured to determine whether a state of the tire is abnormal based on the tire data and control the output unit to output one of the caution signal and the warning signal based on the determination result.

The tire data may include information on an air pressure, an acceleration, and a temperature of the tire, and the controller may be configured to calculate a wear value of the tire based on the air pressure and the acceleration, and determine whether the state of the tire is abnormal based on the air pressure, the acceleration, the temperature, and the wear value.

The tire may include a plurality of tires, wherein the acceleration may include a first acceleration in a tangential direction of the tire and a second acceleration in a radial direction of the tire, the tangential direction being perpendicular to the radial direction, and the controller may be configured to calculate one or more first differences between air pressures of at least two of the tires included in the tire data, and allows the output unit to output the caution signal when at least one of the first differences is equal to or greater than a predetermined first value, the controller may allow the output unit to output the warning signal when a second difference between one of the air pressures included in the tire data and a predetermined appropriate air pressure value is equal to or greater than a predetermined second value, the controller may allow the output unit to output the caution signal when one of the temperatures included in the tire data is equal to or greater than a predetermined temperature value, the controller may be configured to calculate a temperature change amount in at least one of the tires based on the temperatures included in the tire data, and allows the output unit to output the warning signal when the temperature change amount is equal to or greater than a predetermined temperature change amount, the controller may allow the output unit to output the caution signal when a third difference between the first acceleration in each of the tires and a preset first acceleration is equal to or greater than a predetermined first acceleration value, or a fourth difference between the second acceleration in each of the tires and a preset second acceleration is equal to or greater than a predetermined second acceleration value, and the controller may be configured to calculate a wear rate of at least one of the tires based on the wear value, and allows the output unit to output the caution signal when the wear rate is equal to or greater than a preset reference wear value.

The tire monitoring system may further include a server configured to communicate with the transceiver, wherein the controller may be configured to create state data for the tires based on the determination result, the state data including information on an air pressure of the tire, and wherein the server may be configured to determine whether air in the tire leaks based on the air pressure included in the state data, and transmit a leakage caution signal to the communication module based on a determination result regarding a leakage of the air.

The tire may include a first tire and a second tire, wherein the sensor module may include a plurality of sensor modules, the plurality of sensor modules may include a first sensor module provided in the first tire to obtain first tire data of the first tire and a second sensor module provided in the second tire to obtain second tire data of the second tire, wherein the communication module may include: a master having the transceiver, the controller, and the output unit, the master receiving the first tire data through the transceiver; and a slave disposed closer to the second tire than the master, the slave receiving the second tire data and transmitting the second tire data to the master, and wherein the master may be configured to determine whether states of the first tire and the second tire are abnormal through the first tire data and the second tire data.

Another aspect is a tire monitoring method using a tire monitoring system, including: collecting tire data through a sensor module included in the tire monitoring system and provided in a tire; determining a state of the tire through a communication module included in the tire monitoring system determining whether a state of the tire is abnormal based on the tire data; creating state data of the tire based on a result of the determination on whether the state is abnormal; and outputting one of a caution signal and a warning signal based on the determination result through the communication module.

The state data may include information on an air pressure of the tire. The method may further include: determining, through a server included in the tire monitoring system, whether air in the tire leaks based on the air pressure after the creating state data; and transmitting a leakage caution signal to the communication module based on a determination result regarding a leakage of the air through the server.

According to the tire monitoring system and a tire monitoring method using the same of the present disclosure, when it is determined that the state of the tire is abnormal, it is possible to output a caution signal or a warning signal to warn a driver.

In addition, since the communication module is constituted by a master and a slave, the present disclosure can be applied to various vehicles.

BRIEF DESCRIPTION OF THE DRAWINGS

FIG. 4 is a diagram illustrating state data of the tire.

DETAILED DESCRIPTION

Figure 1:
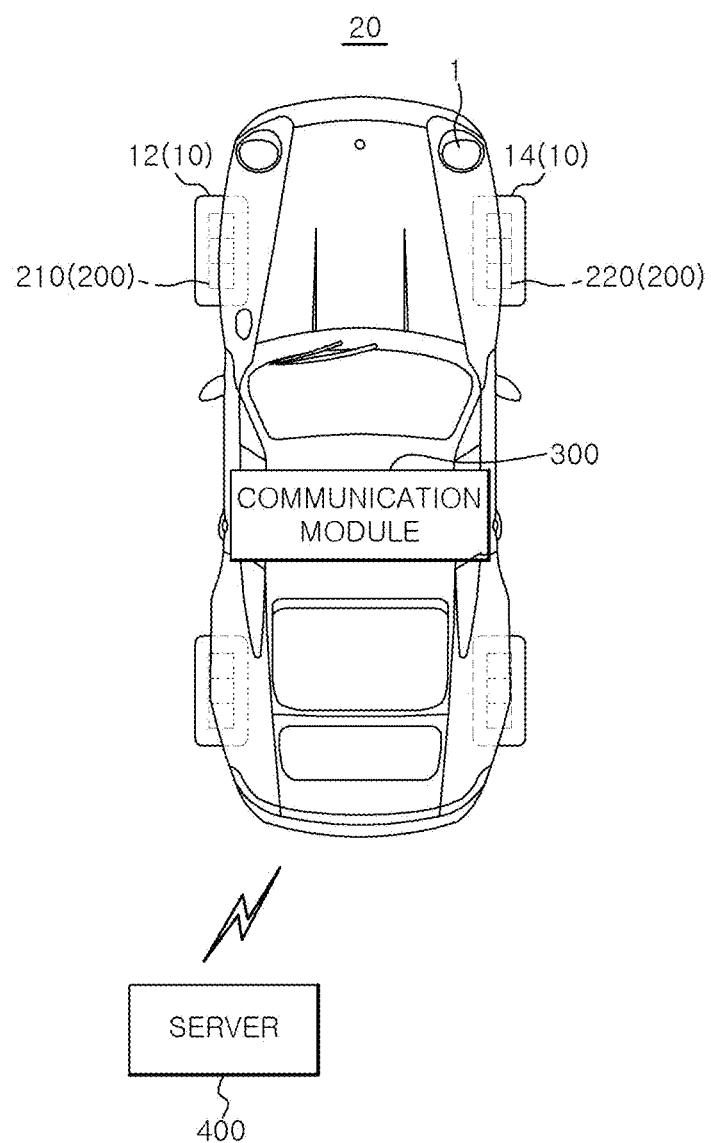
FIG. 1 is a diagram illustrating a state in which a tire monitoring system according to an embodiment of the present disclosure is applied to a passenger vehicle.

One of the factors influencing safe driving is functionality and a proper operation of a component (that is, braking system, tire, ignition system) of a vehicle, which is the most important. In terms of a tire, a factor affecting safety includes an air pressure of the tire and a temperature of the tire in addition to a groove on a surface of the tire. Therefore, it is very important to detect continuously the air pressure and the temperature of the tire in vehicle operation.

For example, if an air pressure of the tire is maintained at a pressure lower than a normally required pressure for a long period of time, the tire tends to have a dramatic temperature rise that may cause a puncture when the vehicle moves at a high speed. On the contrary, when the air pressure of the tire is too high, a gripping force of the tire decreases, thereby causing the deterioration of a braking force and a stability of a high-speed driving in a vehicle. In view of the above, there is a demand for a tire monitoring system that can accurately determine a state of a tire and warn a driver when an abnormality is detected.

Hereinafter, specific embodiments for implementing the technical spirit of the present disclosure will be described with reference to the accompanying drawings.

In describing the embodiments of the present disclosure, the detailed descriptions of well-known functions or configurations will be omitted if it is determined that the detailed descriptions of well-known functions or configurations may unnecessarily make obscure the spirit of the present disclosure.

When an element is referred to as being 'connected' to, 'supported' by, 'accessed' by, or 'supplied' to, 'transferred' to, or 'contacted' with another element, it should be understood that the element may be directly connected to, supported by, accessed by, or supplied to, transferred to, or contacted with the other element, but that other elements may exist in the middle.

The terms used in the present disclosure are only used for describing specific embodiments, and are not intended to limit the present disclosure. Singular expressions include plural expressions unless the context clearly indicates otherwise.

In addition, in the present disclosure, expressions such as an upper side, a lower side, and a side surface are described with reference to the drawings, and it should be noted in advance that if the direction of the object is changed, it may be expressed differently. For the same reason, some components in the accompanying drawings are exaggerated, omitted, or schematically illustrated, and the size of each component does not entirely reflect the actual size.

The terms used herein, including ordinal numbers such as "first" and "second" may be used to describe, and not to limit, various components. The terms simply distinguish the components from one another.

The meaning of "including" as used in the specification specifies a specific characteristic, region, integer, step, action, element and/or component, but does not exclude the existence or addition of other specific characteristic, region, integer, step, action, element, component and/or group.

Hereinafter, a tire monitoring system 20 according to an embodiment of the present disclosure will be described with reference to FIGS. 1 to 6.

Figure 2:
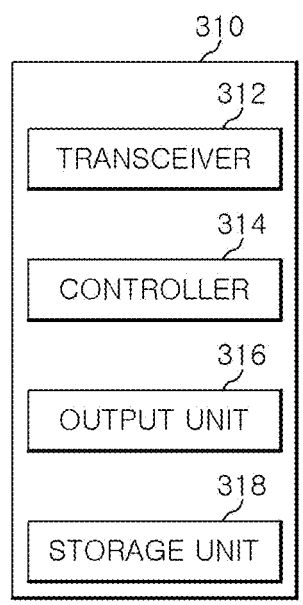
FIG. 2 is a block diagram of a communication module of the tire monitoring system according to the embodiment of the present disclosure.
Figure 3:
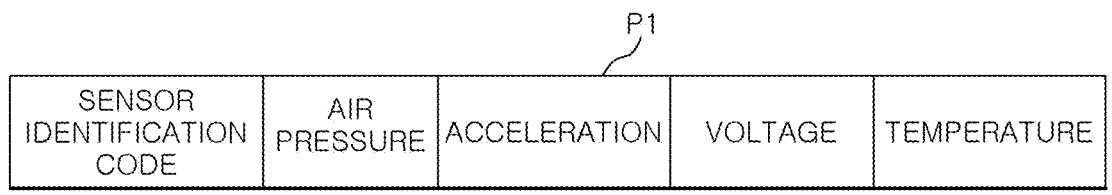
FIG. 3 is a diagram illustrating data of a tire.

Referring to FIGS. 1 to 3, the tire monitoring system 20 according to the embodiment of the present disclosure may include a sensor module 200 and a communication module 300.

Figure 5:
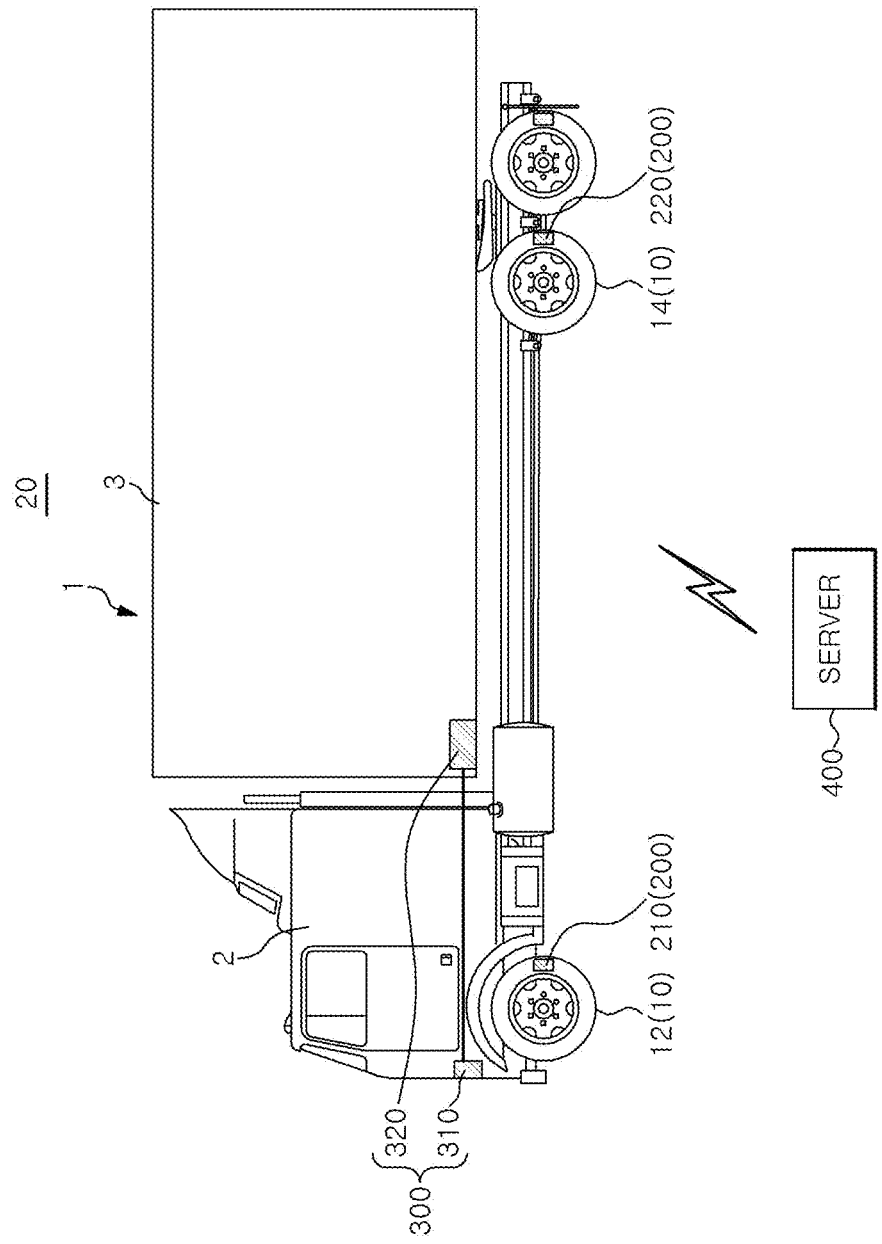
FIG. 5 is a diagram illustrating a state in which the tire monitoring system according to the embodiment of the present disclosure is applied to a heavy vehicle.

The sensor module 200 may be installed in each of tires 10 provided in a vehicle 1 to obtain tire data P1. The vehicle 1 may be a general passenger vehicle as illustrated in FIG. 1 or may be a large vehicle such as a truck or a bus as illustrated in FIG. 5. The sensor module 200 may include one or more sensors, e.g., an air pressure sensor, a temperature sensor, an acceleration sensor, and a voltage sensor. Further, a unique sensor identification code may be stored in the sensor module 200. The voltage sensor may serve to detect a voltage of the sensor module 200. The acceleration sensor may detect information on an acceleration including a first acceleration in a tangential direction of the tire and a second acceleration in a radial direction of the tire. The tangential direction may a direction perpendicular to the radial direction of the tire and perpendicular to an axial direction of the tire. The tire data P1 obtained from the sensor module 200 may include at least one of an air pressure, a temperature, an acceleration, and a voltage of any one of the plurality of tires 10 and a sensor identification code as illustrated in FIG. 3. The sensor module 200 may periodically transmit the tire data P1 to the communication module 300. In addition, the sensor module 200 may be formed in a plurality and provided in each tire 10. The plurality of sensor modules 200 may include a first sensor module 210 and a second sensor module 220. Further, the tire data P1 may include a first tire data P12 obtained from the first sensor module 210 and a second tire data P14 obtained from the second sensor module 220.

The first sensor module 210 may be installed in a first tire 12 to acquire first tire data P12 of the first tire 12 and transmit the first tire data P12 to the communication module 300. Here, the first tire data P12 may include an air pressure, a temperature, an acceleration of the first tire 12, a voltage of the first sensor module 210, and sensor identification code information of the first sensor module 210. The first tire data P12 may be periodically transmitted.

The second sensor module 220 may be installed in the second tire 14 to acquire second tire data P14 of the second tire 14, and transmit the second tire data P14 to the communication module 300. The second tire data P14 may include an air pressure, a temperature, an acceleration of the second tire 14, a voltage of the second sensor module 220, and sensor identification code information of the second sensor module 220. Further, when the vehicle 1 is a large vehicle as illustrated in FIG. 5, the first tire 12 may be a front tire, and the second tire 14 may be a rear tire. The second tire data P14 may be periodically transmitted.

The communication module 300 may be installed in the vehicle 1 to receive the tire data P1 transmitted from each sensor module 200, and determine a state of at least one of the plurality of tires 10 based on the tire data P1. The communication module 300 may periodically receive the tire data P1. In other words, the communication module 300 may receive the first tire data P12 of the first sensor module 210 and the second tire data P14 of the second sensor module 220.

The communication module 300 may include a transceiver 312, a controller 314, an output unit 316, and a storage unit 318.

The transceiver 312 may communicate with the sensor module 200 and a server 400 to receive the tire data P1 transmitted from the sensor module 200. A tag in which a unique tire identification code is stored may be installed in each tire 10. When the transceiver 312 communicates with the tag, the transceiver 312 may receive the tire identification code or receive the tire identification code through a separate device that communicates with the tag. The tag may be formed of an RFID tag. The transceiver 312 may include an RF (radio frequency) communication unit, an LF (low frequency) communication unit, a GPS (global positioning system), an antenna, or the like.

The controller 314 may determine whether at least one of the plurality of tires 10 is abnormal based on the tire data P1. The controller 314 may calculate a wear value of any one of a plurality of tires based on an air pressure and an acceleration of any one of the plurality of tires 10, and determine whether a state of at least one of the plurality of tires 10 is abnormal based on at least one of the air pressure, the acceleration, a temperature, and the wear value.

Hereinafter, it will be described that the controller 314 determines whether the state of any one of the plurality of tires 10 is abnormal based on the tire data P1. However, it is not limited to only one of the plurality of tires 10, and may be applied to the rest of the plurality of tires 10.

The controller 314 may calculate an air pressure difference between the plurality of tires 10 based on the air pressure included in the tire data P1, and when the air pressure difference is formed to be equal to or greater than a preset difference, the controller may determine that any one of the plurality of tires 10 is abnormal and control the output unit 316 to output a caution signal. In other words, by comparing the air pressure of the first tire data P12 and the air pressure of the second tire data P14, the air pressure difference between the tires 10 may be calculated. For example, the preset difference may be set to 10%, but is not limited thereto.

The air pressure difference calculated by the controller 314 may be calculated as an air pressure difference between at least some of the tires 10. For example, an air pressure difference between the tires 10 located in front of a vehicle may be calculated or an air pressure difference between tires located in a rear of a vehicle may be calculated, and compared with the preset difference.

In addition, when a difference between an air pressure and a preset appropriate air pressure is formed to be equal to or greater than a set difference value, the controller 314 may determine that a state of any one of the plurality of tires 10 is abnormal and control the output unit 316 to output a warning signal. The appropriate air pressure may be an appropriate air pressure of any one of the plurality of tires 10 set during a production process of a tire 10 or an appropriate air pressure provided from the vehicle 1. For example, the set difference value may be about 20%, but is not limited thereto.

In addition, when a temperature included in the tire data P1 is equal to or greater than a preset temperature, the controller 314 may determine that a state of any one of the plurality of tires 10 is abnormal and control the output unit 316 to output a caution signal. For example, the preset temperature may be set to about 90° C.

Moreover, the controller 314 may calculate a temperature change amount of at least one of the plurality of tires 10 based on the temperature included in the tire data P1. For example, the controller 314 may measure the temperature change amount through a temperature included in at least some of the plurality of tire data P1 received during a specific time.

When the temperature change amount is equal to or greater than a preset temperature change amount, the controller 314 may determine that a state of any one of the plurality of tires 10 is abnormal and control the output unit 316 to output a warning signal. For example, the preset temperature change amount may be about 20° C. Meanwhile, in another embodiment, even if the temperature is less than or equal to a preset temperature, when the temperature change amount is equal to or greater than the preset temperature change amount, the controller 314 may control the output unit 316 to output a warning signal.

Unlike the above, when the temperature included in the tire data P1 is equal to or greater than a preset temperature and the temperature change amount is equal to or greater than the preset temperature change amount, the controller 314 may control the output unit 316 so that the output unit 316 outputs a warning signal.

In still another embodiment, even when the temperature included in the tire data P1 is equal to or greater than a preset temperature or the temperature change amount is equal to or greater than the preset temperature change amount, the controller 314 may control the output unit 316 to output a warning signal.

In addition, a difference between the first acceleration in the tangential direction included in the tire data P1 and a preset first acceleration in the tangential direction is equal to or greater than a tangential acceleration value, or a difference between the second acceleration in the radial direction included in the tire data P1 and a preset second acceleration in the radial direction is equal to or greater than a radial acceleration value, the controller 314 may determine that a state of any one of the plurality of tires 10 is abnormal and control the output unit 316 to output a caution signal. For example, the first acceleration value may be set to 0.3 g, and the second acceleration value may be set to 0.5 g.

The controller 314 may calculate a wear rate of any one of the plurality of tires 10 based on the previously calculated wear value and a tread thickness of any one of the plurality of tires 10 stored in advance, and when the calculated wear rate is equal to or greater than a preset reference wear rate, the controller 314 may determine that a state of any one of the plurality of tires 10 is abnormal and control the output unit to output a caution signal.

Meanwhile, the wear value calculated by the controller 314 may be calculated by an equation as follows.

$$\text{Wear} = \sum_{i=0}^{n} A(WI, SF_{output}) \left\{ \frac{\exp(R(i, \Delta acc_x, \Delta p, SF_{input})) - \exp((-R(i, \Delta acc_x, \Delta p, SF_{input}))}{\exp(R(i, \Delta acc_x, \Delta p, SF_{input})) + \exp((-R(i, \Delta acc_x, \Delta p, SF_{input}))} \right\} \quad \text{(Equation 1)}$$

Here, "Wear" represents a wear value, and "WI" represents Wear Index, which is a constant provided in each tire 10. "$SF_{input}$" is a constant, and may be 0.003 when the vehicle 1 having the plurality of tires 10 is a general vehicle, and 2.0 when the vehicle 1 is a sport utility vehicle (SUV). "$SF_{output}$" is a constant value, and may be 0.0001625 when the vehicle 1 having the plurality of tires 10 is a general vehicle, and 0.00001 when the vehicle 1 is an SUV. "$acc_x$" represents an acceleration in the tangential direction and "p" represents an air pressure.

The function included in Equation 1 may be calculated through Equations 2 to 6 as follows.

$$A = SF_{output}\left(\frac{1000 - WI}{WI}\right)^{1.3}$$ (Equation 2)

$$R = (SF_{input} + SF_{input}(\Delta acc_x + \text{raio\_p}))i$$ (Equation 3)

$$i = 1, \ldots, n$$

In Equation 3, a value of "i" increases according to a period in which the sensor module 200 acquires information on any one of the plurality of tires 10.

$$|\Delta acc_x| = |acc_x(i) - acc_x(i-1)|$$ (Equation 4)

In Equation 4, "$acc_x(i)$" represents an acceleration in the tangential direction detected after "$acc_x(i-1)$".

$$\Delta p = p(i) - p(i-1)$$ (Equation 5)

In Equation 5, "p(i)" represents an air pressure detected after "p(i−1)".

$$\text{ratio\_p} = \frac{(\text{set\_p} - p(i))}{\text{set\_p}}$$ (Equation 6)

In Equation 6, "set_p" is a constant value provided in the vehicle 1 as an appropriate air pressure.

The controller 314 may form state data P2 of the plurality of tires 10 based on a result of determining whether a state of at least one of the plurality of tires 10 is abnormal.

As illustrated in FIG. 4, the state data P2 may include a communication module identification code and a plurality of sensor identification codes, and may include at least one of tire identification codes of the plurality of tires 10, an air pressure, an acceleration, a voltage, a temperature, a wear rate, GPS information, and state abnormality information. In addition, the tire identification code, the air pressure, the acceleration, the voltage, the temperature, the wear rate, and the state abnormality information included in the state data P2 may be classified and listed for each tire. The GPS information may be a location of the vehicle 1 or information indicating a location of each tire, and information indicating whether there is an abnormality in the air pressure, the acceleration, the temperature, the wear rate, and the voltage of each tire 10 may be stored in the state abnormality information as a code. When there is an abnormality in the voltage, the controller 314 may determine that there is an abnormality in the sensor module. The state data P2 may be transmitted to the server 400 by the transceiver 312.

The storage unit 318 may store the unique communication module identification code of the communication module 300 described above. Information on the tread thickness of each of the plurality of tires 10 provided in the vehicle 1 may be stored in the storage unit 318. In addition, the storage unit 318 may store the tire data P1 and the state data P2.

The output unit 316 may be controlled by the controller 314. One of the caution signal and the warning signal may be output based on the result of the state abnormality determined by the controller 314. Here, the output unit 316 may include at least one of a light emitting lamp, a speaker, and a display unit. The light emitting lamp may emit light in different colors when outputting the caution signal and the warning signal, the speaker may output different sounds when outputting the caution signal and the warning signal, and the display unit may display different phases or images according to the caution signal and the warning signal. When there is no abnormal condition as a result of determining the plurality of tires 10 by the controller 314, the output unit 316 may output a normal signal or may not be operated.

As the output unit 316 is controlled by the controller 314, at least one of the normal signal, the caution signal, and the warning signal can be transmitted from the server 400 to a mobile phone of a driver, and the driver can monitor the state of the tire 10 through the mobile phone.

Figure 6:
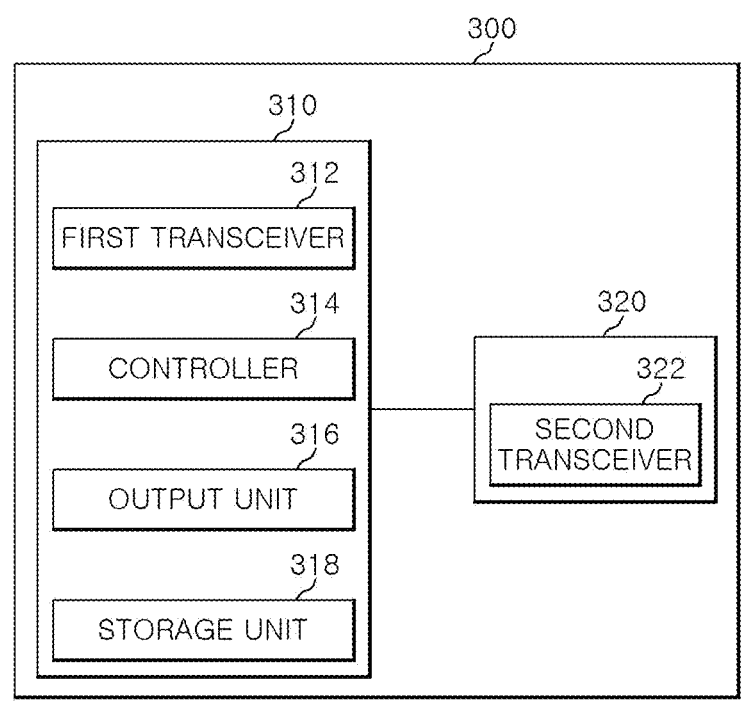
FIG. 6 is a block diagram illustrating a master and a slave of the tire monitoring system according to the embodiment of the present disclosure.

Referring to FIGS. 5 and 6, the communication module 300 may include a master 310 and a slave 320. A reason for forming the master 310 and the slave 320 in this way is to efficiently apply to a large vehicle such as a truck and a bus. If the master 310 and the slave 320 are not formed, information on any one of the plurality of tires 10 provided in the large vehicle may not be efficiently received depending on a size of the large vehicle. Meanwhile, the master 310 and the slave 320 may communicate with each other by wire or wirelessly.

The master 310 may receive the first tire data P12 transmitted from the above-described first sensor module 210. Specifically, the master 310 may be provided in a seat 2 of the driver as illustrated in FIG. 5. However, the present disclosure is not limited thereto and the master 310 may be installed outside the seat 2 of the driver and closer to the first tire 12 than the second tire 14.

In addition, the master 310 may include the transceiver 312, the controller 314, the output unit 316, and the storage unit 318 described above, and receive the first tire data P12 by the transceiver 312. Hereinafter, the transceiver 312 included in the master 310 will be referred to as a first transceiver 312.

The slave 320 may be installed closer to the second tire 14 than the master 310 to receive the second tire data P14 transmitted from the second sensor module 220 and transmit the second tire data P14 to the master 310. According to the above, the slave 320 may include a second transceiver 322 receiving the second tire data P14 and transmitting the second tire data P14 to the master 310. For example, the slave 320 may be installed in the vicinity of a trailer 3 outside the seat 2 of the driver as illustrated in FIG. 1.

The second transceiver 322 may communicate with the first transceiver 312 by wire or wirelessly, and may include an RF communication unit, an LF communication unit, and an antenna.

Meanwhile, in the truck illustrated in FIG. 5, the master 310 is installed in the seat 2 of the driver or outside the seat 2 of the driver, and the slave 320 is installed outside the seat 2 of the driver, but these may be changed according to the type of the vehicle 1 including the communication module 300. For example, when the communication module 300 is installed in the bus, both the master 310 and the slave 320 may be provided inside the bus.

As described above, the master 310 may determine whether the first tire 12 and the second tire 14 are abnormal through the first tire data P12 and the second tire data P14, and thus, form the state data P2 for the first tire 12 and the second tire 14.

Further, the master 310 may transmit the state data P2 to the server 400 through the first transceiver 312.

The server 400 receives and manages the state data P2 transmitted through the transceiver 312 of the communication module 300. For example, the received state data P2 may be stored for 30 days. As the state data P2 is periodically transmitted from the communication module 300, the server 400 may store and manage a plurality of state data P2. The server 400 may transmit the normal signal, the warning signal, and the caution signal to the mobile phone based on the state data P2.

In addition, the server 400 may determine whether at least one of the plurality of tires 10 leaks air pressure based on information on the air pressure included in the state data P2. The server 400 may transmit a leakage caution signal to the transceiver 312 of the communication module 300 or directly transmit the mobile phone of the driver according to the determination of the air pressure leakage. Accordingly, the output unit 316 of the communication module 300 may output the caution signal according to the received leakage caution signal, and the driver may check the state of the tire 10 through the mobile phone or the communication module 300.

For example, when a difference of 1 psi or more in the air pressure of the tire 10 occurs as a result of comparing a plurality of air pressure information received during a specific time, the controller 314 may determine that the air pressure is leaked.

Hereinafter, a tire monitoring method according to the embodiment of the present disclosure will be described.

Figure 7:
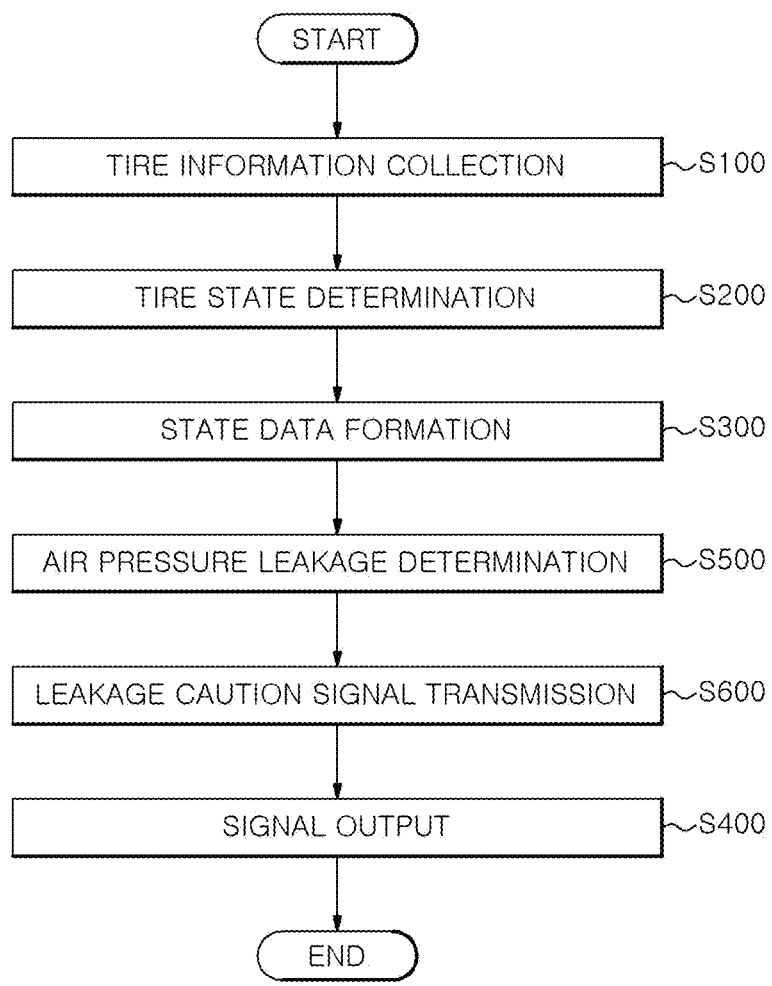
FIG. 7 is a flowchart illustrating a tire monitoring method using the tire monitoring system according to the embodiment of the present disclosure.

Referring to FIG. 7, a tire monitoring method using a tire monitoring system according to the embodiment of the present disclosure may include a data information collection step S100, a state determination step S200, a state data forming step S300, and a signal output step S400.

The data information collection step S100 is a step in which the sensor module 200 provided in the tire 10 acquires the tire data P1. The sensor module 200 may form tire data P1 including at least one of the air pressure, the temperature, the acceleration, and the voltage of the tire 10 and a sensor identification code.

The state determination step S200 is a step in which the communication module 300 determines whether the state of the tire 10 is abnormal based on the tire data P1. In the step S200, the controller 314 may calculate the wear value as described above to determine whether the state of the tire 10 is abnormal, and may determine whether the state of the tire 10 is abnormal based on at least one of the air pressure, the acceleration, the voltage, the temperature, and the wear value.

The state data forming step S300 is a step of forming the state data P2 of the tire 10 based on a result of determining whether the state is abnormal. The state data P2 may include at least one of the communication module identification code, the tire identification code, the sensor identification code, the air pressure, the acceleration, the voltage, the temperature, the wear rate, the GPS information, and the state abnormality information.

The signal output step S400 is a step of outputting one of the normal signal, the caution signal, and the warning signal from the communication module 300 depending on the determination result in the state determination step S200.

The output unit 316 may output the normal signal, the caution signal, and the warning signal through at least one of the light emitting lamp, the speaker, and the display unit. In addition, the normal signal, the caution signal, and the warning signal are transmitted to the mobile phone of the driver, and thus, the driver can monitor the state of the tire 10 through the mobile phone.

In addition, the tire monitoring method using the tire monitoring system according to the embodiment of the present disclosure may include a leakage determination step S500 and a leakage caution signal transmission step S600 after the state data forming step S300.

The leakage determination step S500 is a step of determining whether at least one of the plurality of tires 10 leaks air based on the air pressure information included in the state data P2 by the server 400. For example, when the air pressure of at least one of the plurality of tires 10 differs by 1 psi or more as a result of comparing the plurality of air pressure information received during a specific time, the server 400 may determine that the air pressure is leaked.

In the leakage caution signal transmission step S600, the server 400 transmits the leakage caution signal to the communication module 300 or the mobile phone of the driver according to the determination of the air leakage. The output unit 316 of the communication module 300 may output a caution signal by the leakage caution signal, and the driver may check whether at least one of the plurality of tires 10 leaks air through the mobile phone.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A tire monitoring system comprising:
a sensor module installed in a tire provided in a vehicle to obtain tire data; and
a communication module including:
a transceiver configured to transmit and receive the tire data;
an output unit configured to output one of a caution signal and a warning signal; and
a controller configured to determine whether a state of the tire is abnormal based on the tire data and control the output unit to output one of the caution signal and the warning signal based on a determination result,
wherein the tire data includes information on an air pressure, an acceleration, and a temperature of the tire,
wherein the controller is configured to calculate a wear value of the tire based on the air pressure and the acceleration, and determine whether the state of the tire is abnormal based on the air pressure, the acceleration, the temperature, and the wear value,
wherein the tire includes a plurality of tires,
wherein the acceleration includes a first acceleration in a tangential direction of the tire and a second acceleration in a radial direction of the tire, the tangential direction being perpendicular to the radial direction of the tire and an axial direction of the tire, wherein the controller is configured to calculate one or more first differences between air pressures of at least two of the tires included in the tire data, and cause the output unit to output the caution signal when at least one of the first differences is equal to or greater than a predetermined first value, wherein the controller is configured to cause the output unit to output the warning signal when a second difference between one of the air pressures included in the tire data and a predetermined appropriate air pressure value is equal to or greater than a predetermined second value, wherein the controller is configured to cause the output unit to output the caution signal when one of the temperatures included in the tire data is equal to or greater than a predetermined temperature value, the controller is configured to calculate a temperature change amount in at least one of the tires based on the temperatures included in the tire data, and cause the output unit to output the warning signal when the temperature change amount is equal to or greater than a predetermined temperature change amount, the controller is configured to cause the output unit to output the caution signal when a third difference between the first acceleration in each of the tires and a preset first acceleration is equal to or greater than a predetermined first acceleration value, or a fourth difference between the second acceleration in each of the tires and a preset second acceleration is equal to or greater than a predetermined second acceleration value, and the controller is configured to calculate a wear rate of at least one of the tires based on the wear value, and cause the output unit to output the caution signal when the wear rate is equal to or greater than a preset reference wear value.

2. The tire monitoring system of claim 1, further comprising:

a server configured to communicate with the transceiver, wherein the controller is configured to create state data for the tires based on the determination result, the state data including information on an air pressure of the tire, and wherein the server is configured to determine whether air in the tire leaks based on the air pressure included in the state data, and transmit a leakage caution signal to the communication module based on a determination result regarding a leakage of the air.

3. A tire monitoring system comprising:

a sensor module installed in a tire provided in a vehicle to obtain tire data; and a communication module including:
   a transceiver configured to transmit and receive the tire data;
   an output unit configured to output one of a caution signal and a warning signal; and
   a controller configured to determine whether a state of the tire is abnormal based on the tire data and control the output unit to output one of the caution signal and the warning signal based on a determination result, wherein the tire includes a first tire and a second tire, wherein the sensor module includes a plurality of sensor modules, wherein the plurality of sensor modules include a first sensor module provided in the first tire to obtain first tire data of the first tire and a second sensor module provided in the second tire to obtain second tire data of the second tire, wherein the communication module includes:
   a master having the transceiver, the controller, and the output unit, the master receiving the first tire data through the transceiver; and
   a slave disposed closer to the second tire than the master, the slave receiving the second tire data and transmitting the second tire data to the master, and wherein the master is configured to determine whether states of the first tire and the second tire are abnormal through the first tire data and the second tire data.

4. A tire monitoring method using the tire monitoring system of claim 3, comprising:

collecting tire data through the sensor module included in the tire monitoring system and provided in the tire;

determining a state of the tire through the master included in the communication module determining whether the state of the tire is abnormal based on the tire data;

creating state data of the tire based on a result of a determination on whether the state is abnormal; and outputting one of a caution signal and a warning signal based on the determination result through the communication module.

5. The tire monitoring method of claim 4, wherein the state data includes information on an air pressure of the tire, the method further comprising:

determining, through a server included in the tire monitoring system, whether air in the tire leaks based on the air pressure after the creating state data; and transmitting a leakage caution signal to the communication module based on a determination result regarding a leakage of the air through the server.

* * * * *